Dec. 24, 1968  J. CARTER ET AL  3,418,099
APPARATUS FOR SUPPORTING AND GLAZING GLASS ARTICLES
Original Filed July 7, 1965  6 Sheets-Sheet 1
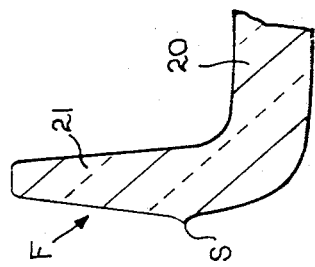
FIG. 9
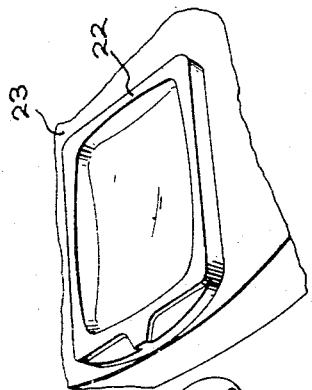
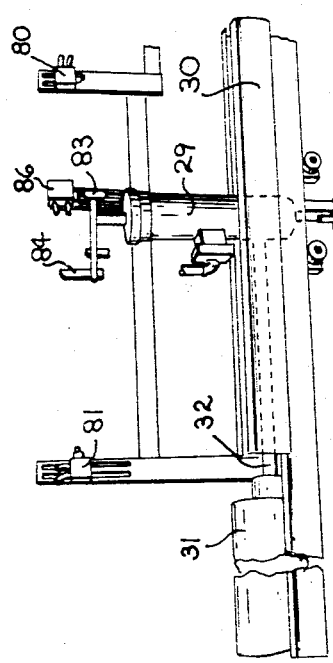
FIG. 1
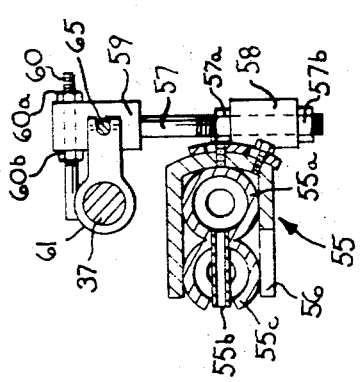
FIG. 8
INVENTORS
JACK CARTER
MARIO CUNIBERTI
JOHN E. SCOTT
BY
ATTORNEYS

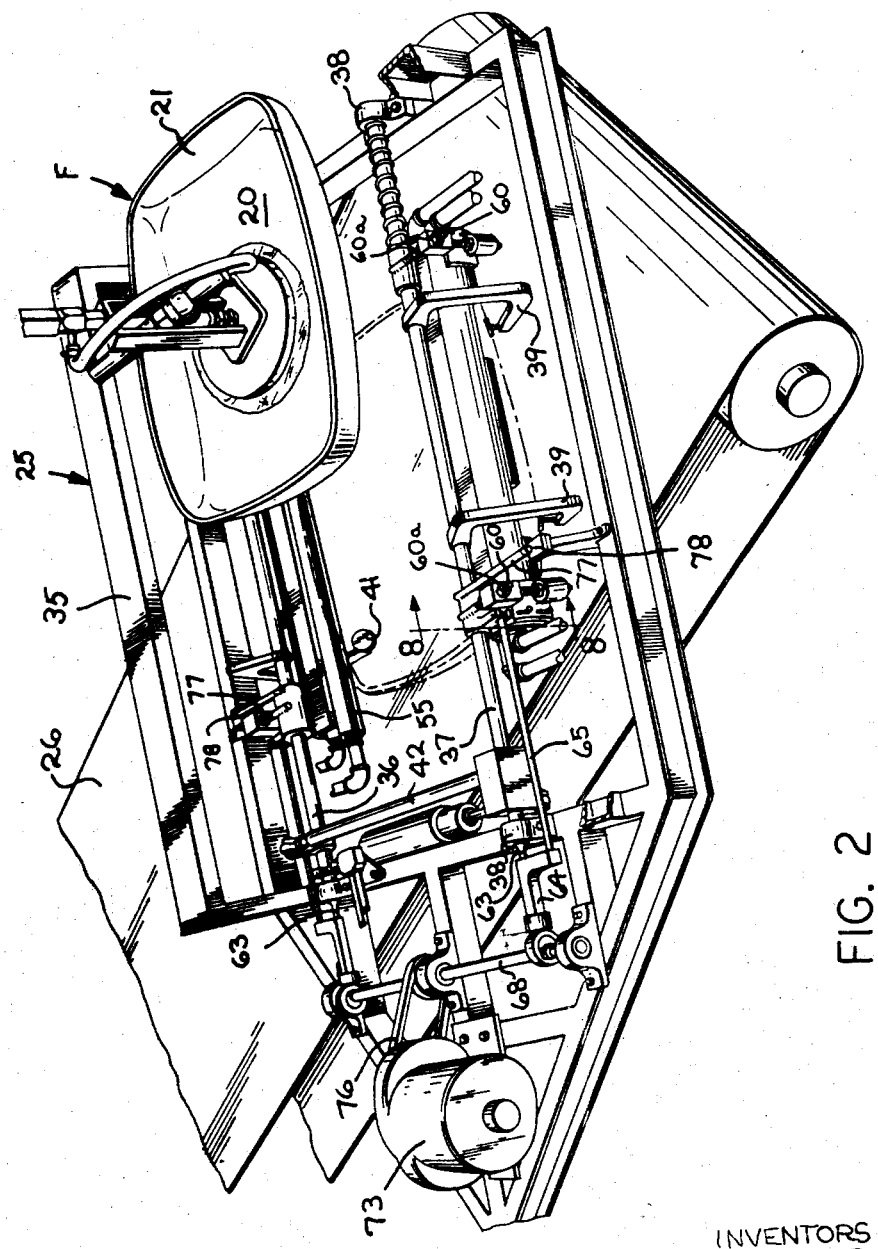

Dec. 24, 1968  J. CARTER ET AL  3,418,099
APPARATUS FOR SUPPORTING AND GLAZING GLASS ARTICLES
Original Filed July 7, 1965  6 Sheets-Sheet 3

INVENTORS
JACK CARTER
MARIO CUNIBERTI
JOHN E. SCOTT
BY
ATTORNEYS

Dec. 24, 1968  J. CARTER ET AL  3,418,099
APPARATUS FOR SUPPORTING AND GLAZING GLASS ARTICLES
Original Filed July 7, 1965  6 Sheets-Sheet 4

INVENTORS
JACK CARTER
MARIO CUNIBERTI
JOHN E. SCOTT
BY
ATTORNEYS

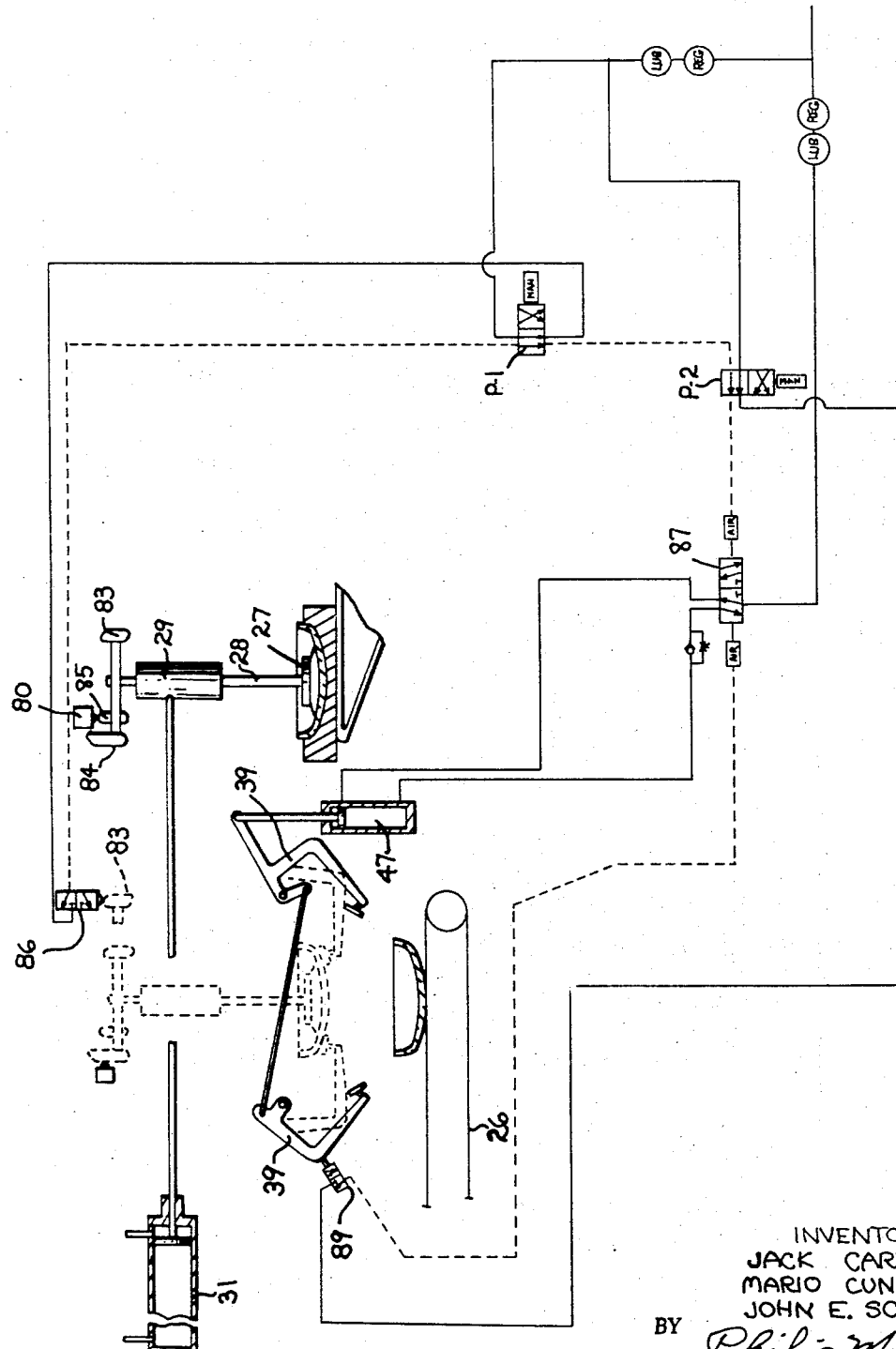

United States Patent Office 3,418,099
Patented Dec. 24, 1968

3,418,099
APPARATUS FOR SUPPORTING AND GLAZING GLASS ARTICLES
Jack Carter, Mario Cuniberti, and John E. Scott, Columbus, Ohio, assignors to Owens-Illinois, Inc., a corporation of Ohio
Continuation of application Ser. No. 453,966, July 7, 1965. This application Jan. 2, 1968, Ser. No. 695,287
7 Claims. (Cl. 65—284)

ABSTRACT OF THE DISCLOSURE

This application discloses apparatus for flame-glazing the mold or seam line of a glass television faceplate. The glazing station is located proximate to the molding station so that the faceplate may be glazed while it still retains much of its latent heat. The faceplate is transferred to support means at the glazing station by means of a transfer device comprising a suction head attached to the vertically reciprocatable rod of a fluid cylinder, the cylinder being reciprocatable in a horizontal direction between the molding and glazing stations. At the glazing station the article is glazed by spaced, opposed reciprocatable line burners while the article is supported along each of an opposed pair of sides by at least a pair of arms attached to a common shaft. After the glazing cycle is completed, the support arms are rotated downwardly in unison out of their supporting position to drop the article upon the upper reach of a transfer conveyor for transfer to a subsequent processing station.

---

This application is a continuation of application Ser. No. 453,966, filed July 7, 1965, now abandoned.

This invention relates to glazing portions of glass articles and particularly portions of the glass faceplate which is to be made a part of a glass cathode ray tube bulb.

In the manufacture of glass articles such as a glass faceplate for a cathode ray tube bulb which comprises a substantially flat viewing portion and a peripheral flange, the articles are formed with a seam or mold match line at the area of juncture of separable portions of the mold. For example, in the case of a pressing of a faceplate for a cathode ray tube bulb, there may be a fine seam line in some portions of the area of juncture of the flange and flat viewing portion. In order to prevent points of incipient weakness and improve the appearance of the faceplate, it is necessary to glaze such portions with heat to eliminate the seam line.

It is therefore an object of the invention to provide an apparatus for glazing glass articles efficiently and quickly with a minimum interruption in the production thereof.

It is a further object of the invention to provide such an apparatus wherein glazing of successive glass articles is performed uniformly throughout the desired portions of the glass article.

It is a further object of the invention to provide such an apparatus for glazing the faceplates for cathode ray tube bulbs in such a manner that the desired glazing is achieved without distorting any portions of the bulb.

According to the invention, the article, such as the faceplate, is removed from the forming machine and immediately moved to a support. Burners, which are positioned at the support, direct flames against the desired portions of the article. The article portions are quickly glazed by the combined heat of the burner flames and the latent heat in the article from the forming operation. The article is thereafter released and moved to a subsequent operation. The burners are preferably reciprocated along the seam or mold line in order to uniformly glaze the desired portions without producing hot spots, such as might occur in the event that the burner has some flame portions which produce more heat than other portions.

Figure 3:
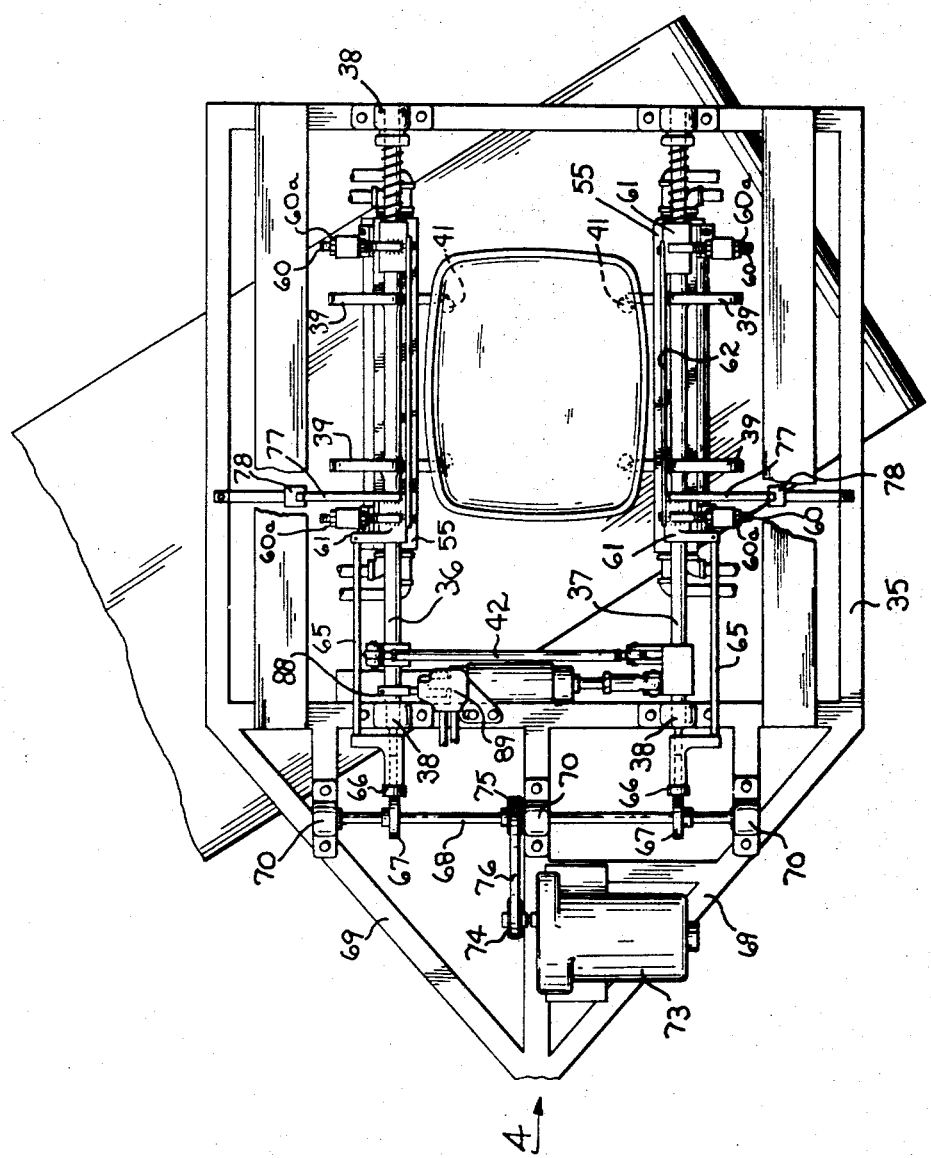
Figure 4:
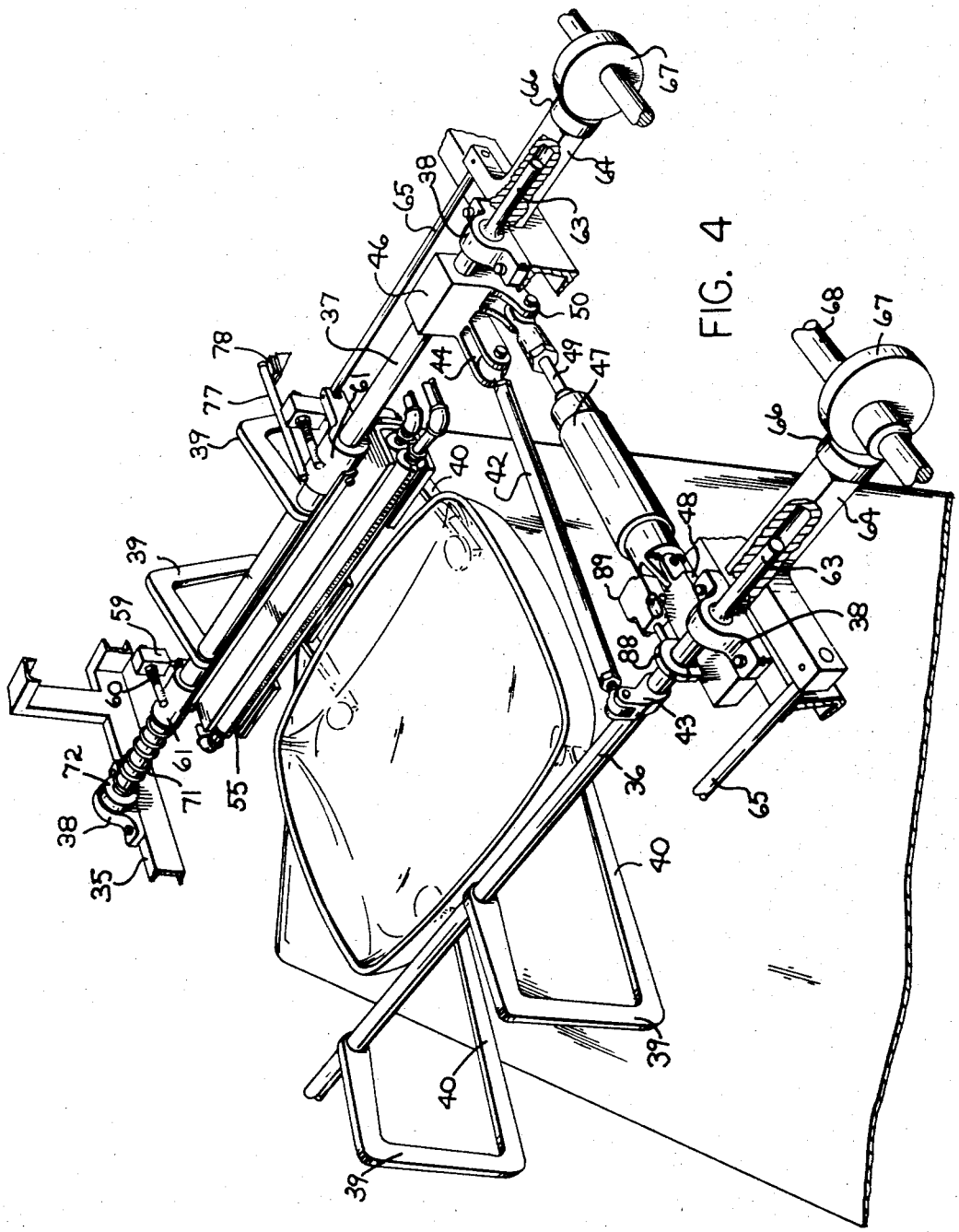
Figure 5:
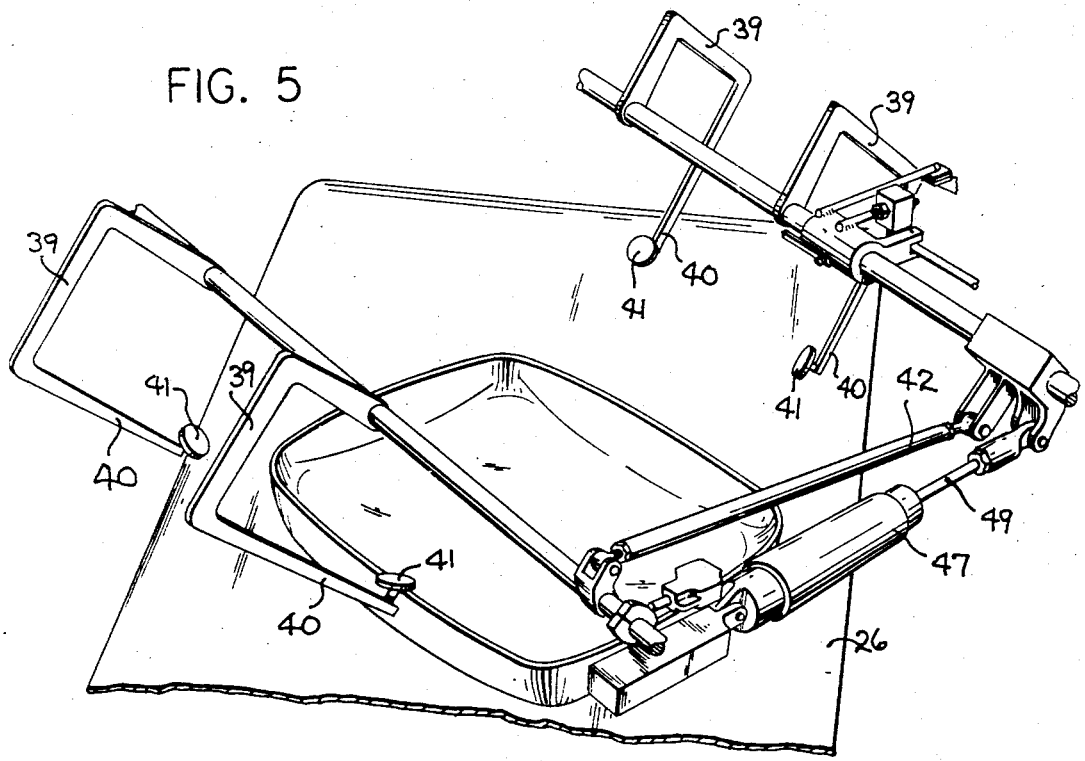
Figure 6:
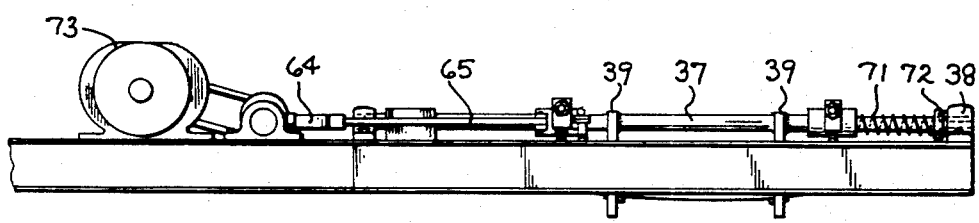

In the drawings:
FIG. 1 is a fragmentary perspective view of an apparatus embodying the invention.
FIG. 2 is a fragmentary perspective view of a portion of the apparatus embodying the invention.
FIG. 3 is a fragmentary plan view of the apparatus shown in FIG. 2.
FIG. 4 is a fragmentary perspective view of the apparatus shown in FIGS. 2 and 3 in the direction of the arrow of FIG. 3, parts being broken away.
FIG. 5 is a fragmentary perspective view similar to FIG. 4, parts being broken away and parts being shown in a different operative position.
FIG. 6 is a side elevational view of the apparatus shown in FIG. 3.
FIG. 7 is a partly diagrammatic, schematic pneumatic diagram utilized in the apparatus.
FIG. 8 is a fragmentary sectional view taken along the line 8—8 in FIG. 2.
FIG. 9 is a sectional view through a faceplate which is to be glazed by the apparatus embodying the invention.

Referring to FIGS. 1, 2 and 3, in accordance with the invention, the glass article is glazed immediately after the forming operation. Thus, the glass faceplate F having a flat viewing portion 20 and an upstanding peripheral flange portion 21 is immediately removed from a mold 22 on the rotary table of a forming machine 23 wherein it has been pressed and is transferred to a burner assembly 25. At the burner assembly, the seam S (FIG. 9) formed at the match line between the base of the mold and the ing. The forming machine 23 may comprise a press which glass article is thereafter released onto a conveyor 26 which carries it to a successive operation such as annealing. The forming machine 23 may comprise a press which has a plurality of circumferentially spaced molds to which charges of molten glass are successively delivered and pressed by actuation of a plunger moving downwardly into each mold successively. Such a press is old and well known in the art.

As shown in FIG. 1, the apparatus for removing each hot glass article from a mold 22 comprises a suction head 27 which is supported by a shaft 28 that is movable upwardly and downwardly by a fluid cylinder 29. The cylinder 29 and shaft 28 are in turn mounted for horizontal movement in a track 30 by a fluid cylinder 31 which has its shaft 32 connected to the cylinder 29. Actuation of the cylinder 31 moves the suction head 27 horizontally between a position overlying a mold 22 and a position overlying burner assembly 25. Actuation of the cylinder 29 moves the suction head 27 upwardly and downwardly at the mold 22 and burner assembly 25.

As hereinafter described, the cylinders 29, 31 are operated to cause the suction head 27 to remove a faceplate F from a mold 22, lift it from the mold, move it horizontally to a position overlying the burner assembly 25, thereafter move the faceplate downwardly and release it onto the burner assembly 25. The suction head 27 then is returned to a successive mold 22 to remove and deliver a successive faceplate to the burner assembly 25 while the first faceplate is being glazed.

Referring to FIGS. 1–5, burner assembly 25 comprises a generally rectangular frame 35 on which a pair of parallel shafts 36, 37 are journalled by pillow blocks 38. Each shaft 36, 37 supports a pair of generally U-shaped arms 39 which are fixed thereto and have inwardly projecting portions 40 with pads 41 on the ends thereof. The shafts 36, 37 are interconnected, as presently described, and are oscillated periodically to move the arms 39 inwardly and outwardly toward and away from one another so that the portions 40 serve as removable supports for a faceplate F. When the arms 39 are moved toward one another, they support a faceplate in position for glazing, and when the arms are moved away from one another, they release the faceplate to permit the faceplate to fall onto an endless conveyor 26 which carries the faceplate away from the burner assembly 25.

Specifically, the shafts 36, 37 are interconnected by a link 42 which extends between a drive lever 43 fixed on shaft 36 and drive lever 44 on a bracket 46 fixed on shaft 37. One end of a fluid cylinder 47 is pivoted at 48 to the frame 35 and the shaft of the cylinder 47 is pivoted to a lever 50 on bracket 46. When fluid is applied to the cylinder 47 to extend the piston shaft 49, the shafts 36, 37 are oscillated to swing the arms 39 away from one another. When the fluid is applied to retract the piston shaft 49, the shafts 36, 37 are oscillated to swing portions 40 of the arms 39 toward one another and create a support for a faceplate delivered downwardly onto the arms by the suction head 27.

As shown in FIGS. 1–4 and 8, an elongated burner 55 is mounted adjacent each of the shafts 36, 37 for directing flames inwardly along the seam line S of the faceplate F. As more specifically shown in FIGS. 4 and 8, each burner 55 is of conventional construction and is constructed to direct oxygen from pipe 55a through fine tubes 55b and fuel such as gas from pipe 55c to the face of the burner where the oxygen and gas mix and burn to direct a fine elongated line of flames against the seam line between the flange and base of the faceplate F.

Each burner 55 is mounted on a U-shaped support 56 which, in turn, is vertically adjustably mounted by screws 57 extending through brackets 58 bolted to support 56 and nuts 57a, 57b threaded on screws 57. The upper end of the screws 57 are fixed in a second set of brackets 59 through which screws 60 extend generally horizontally from guide brackets 61 on the shafts 36, 37, respectively. Screws 60 and nuts 60a and 60b thereby control the horizontal position of the burners relative to brackets 61. The guide brackets 61 are interconnected by a connecting plate 62. The bolted joint between bracket 58 and holder 56 provides for angular adjustment of the burners. Burner holder 56 and bracket 58 are shaped such that angular adjustment of the burners 55 does not affect the vertical or horizontal setting. The center of rotation is about a point ½ inch away from the face of the burner ports.

As shown in FIG. 4, the end of each shaft 36, 37 which extends beyond the frame 35 is reduced as at 63 and a drive arm 64 is telescoped thereon for movement longitudinally. A rod 65 interconnects each drive arm 64 and the nearest bracket 61. A cam follower 66 is mounted on the end of each drive arm 64 and engages a cam 67 fixed on a cross shaft 68 journalled on an extension 69 of the frames 35 by pillow blocks 70 (FIG. 3). A compression spring 71 extends between the other burner slide bracket 61 and a thrust bearing 72 on each shaft 36, 37 to yieldingly urge the cam follower 66 against its respective cam 67. The shaft 68 is continuously rotated to continuously move each burner in a reciprocating manner with respect to the arms 39. This insures that irregularities in the flames of the burner, such as might occur due to manufacture or clogging of the ports of the burner, will not produce hot spots or nonuniform glazing. Specifically, a motor 73 is interconnected with the shaft 68 by pulleys 74, 75 and an endless belt 76 trained over the pulleys.

As shown in FIGS. 2–5, each burner has a stabilizing arm 77 fixed to one bracket 61 and extending into contact with a block 78 fixed on the frame 35. This holds the burner in proper angular relation with respect to the faceplate F. In the event that it is desired to adjust the burner vertically, nuts 57a, 57b may be rotated. In the event that it is desired to move the burner horizontally toward or away from the faceplate, nuts 60a, 60b can be adjusted. The burner assembly is readily adjustable for various sizes of glass ware through use of a plurality of mounting holes for the pillow blocks 38, and the cylinder mounting block 48. For various sizes of glass ware, various lengths of link 42 and block 78 are utilized.

Referring to FIGS. 1 and 7, the controls for cylinders 29 and 31, which move the suction head 27 vertically and horizontally, include valves 80, 81, which form part of a circuit (not shown), the details of which do not form a part of the present invention. Cams 84, 85 that move with the suction head 27 operate the valves 80, 81 to produce the proper sequence of motions of the suction head.

As the suction head 27 is moved to the left, as shown in FIGS. 1 and 7, a pivoted cam lever 83 thereon operates a three-way valve 86 which, in turn, momentarily supplies a puff of air through valves P–1, P–2 to a four-way valve 87. The four-way valve 87 is of the double pilot operated, double detent type. Thus, as a hot newly formed faceplate is brought toward the glazing apparatus by the suction head 27, actuation of valve 87 operates the cylinder 47 to swing the arms 39 outwardly and release the previously glazed faceplate, permitting it to fall to the conveyor 26. Movement of the arms 39 outwardly causes a cam 88 on shaft 36 (FIG. 3) to operate a valve 89 (FIGS. 3, 7) causing a second puff of air to return the four-way valve 87 to its original position. This causes the cylinder 47 to operate and return the arms 39 to support position so that the suction head 27 can deliver the hot faceplate to the arms. After the suction head releases the faceplate, cylinder 31 returns the head to the forming apparatus. On the return stroke, the cam lever 83 pivots past the valve 86 and does not operate the valve.

Operation of valve P–1 or P–2 diverts line pressure directly to the pilot of the four-way valve 87, causing it to operate cylinder 47 and open the arms 39. This line pressure overrides any pressure from valve 89 that would tend to return the arms to their supporting position. While the arms are held in this extreme position, the burner holder 56 can be rotated away from the path of the hot glass a sufficient distance to permit changing the burner 55 without interruption of the forming operation.

In operation, the glass faceplates, which are hot from the forming operation, are successively delivered to the arms 39 and each faceplate is glazed while the suction head 27 returns to the forming apparatus to pick up another hot faceplate. Since the glazing is accomplished while the faceplate is hot and has substantial latent heat, a more efficient glazing operation is achieved. Distortion is prevented by glazing while the flange of the faceplate extends upwardly. In the case of generally rectangular faceplates shown, it has been found that glazing along the long axis is sufficient.

Thus in accordance with the invention, successive faceplates are subjected to precisely the same glazing conditions. By glazing the faceplates prior to delivery to the lehr for annealing, the results of glazing are readily visible thereby permitting adjustments to be made easily. All sides of the rectangular faceplate can be glazed by adding burners along the short sides.

By reciprocating the burners along the seam line, any possibility of hot spots due to uneven temperature in the flames or clogging of any of the burner portions is eliminated. It is preferred that the cams 67 be oriented rotationally as shown in FIG. 4 such that the burners are reciprocated in opposite directions thereby distributing the load on the shaft 68 and motor more uniformly.

It can thus be seen that there has been provided a method and apparatus for glazing glass articles and particularly faceplates efficiently and quickly with minimum interruption in production and without distorting any portions thereof.

We claim:
1. In an apparatus for glazing glass articles, the combination comprising
    a frame, a pair of shafts journalled on said frame in parallel relation to one another, each of said shafts being oscillatable between first and second positions, a pair of longitudinally spaced arms on each said shaft and oscillatable therewith, said arms having support portions adjacent the ends thereof which are in position to support a glass article when the shafts are in the first positions and which are out of support position when the shafts are in the second positions, means interconnecting said shafts and oscillating said shafts to said first positions to support a glass article thereon and to said second positions to release a glass article supported thereon, a pair of burners, mounting means for mounting said burners adjacent said shafts for the direction of flame inwardly toward portions of a glass article supported by said arms, said mounting means including means for periodically reciprocating said burners longitudinally of said shafts to move said flames relative to a glass article supported by said arms to obtain uniform glazing of a glass article in spite of irregularities which may occur in the flames of the burner.

2. The combination set forth in claim 1 wherein said mounting means for supporting said burner comprises brackets slidably mounted on said shaft, a burner mounted on said brackets, and means for periodically reciprocating said brackets and said burner longitudinally of said shaft to move said flames relative to a glass article supported by said arms.

3. The combination set forth in claim 2 wherein said means for periodically reciprocating said brackets comprises a shaft mounted for rotation with its axis generally transverse to the axes of said first-mentioned shafts, cams on said shaft, cam followers on said brackets.

4. The combination set forth in claim 2 including means for angularly adjusting the position of said burners relative to said arms.

5. The combination set forth in claim 4 wherein said means for supporting said burner comprises brackets slidably mounted on said shaft, a burner mounted on said brackets, said last-mentioned means comprises screw means extending between said brackets and said burner.

6. The combination set forth in claim 1 wherein said means for interconnecting and oscillating said shaft includes fluid cylinder means operable to move said shaft.

7. In an apparatus for glazing glass faceplates having a generally flat viewing portion and a peripheral flange portion, the combination comprising a frame, a pair of shafts journalled on said frame in parallel relation to one another, each of said shafts being oscillatable between first and second positions, a pair of longitudinally spaced U-shaped members having arms mounted on each said shaft and oscillatable therewith, said U-shaped members having support portions adjacent the ends of the arms thereof, said support portions being in position to support the viewing portion of a faceplate with the flange portion extending upwardly when the shafts are in the first position, and which are out of support position when the shafts are in the second position, means interconnecting said shafts and oscillating said shafts to said first position to support a faceplate thereon and to said second position to release a faceplate supported thereon, a pair of burners, mounting means for mounting said burners adjacent said shafts for direction of flames inwardly toward portions of a faceplate supported by said arms, said mounting means including means for periodically reciprocating said burners longitudinally of said shafts to move said flames relative to a glass article supported by said arms to obtain uniform glazing of a face plate in support of irregularities which may appear in the flames of the burner.

References Cited

UNITED STATES PATENTS

| | | | |
|---|---|---|---|
| 1,943,500 | 6/1934 | Winkler et al. | 214—6 X |
| 2,567,033 | 9/1951 | Schutz | 65—260 X |
| 2,984,942 | 5/1961 | Wynne et al. | 65—120 |

DONALL H. SYLVESTER, *Primary Examiner.*

A. D. KELLOGG, *Assistant Examiner.*

U.S. Cl. X.R.

65—104, 120, 227, 260, 268; 214—1, 6; 263—6